R. E. O'NEIL.
AUTOMOBILE BRACING ATTACHMENT.
APPLICATION FILED JULY 3, 1917.
1,269,955.
Patented June 18, 1918.
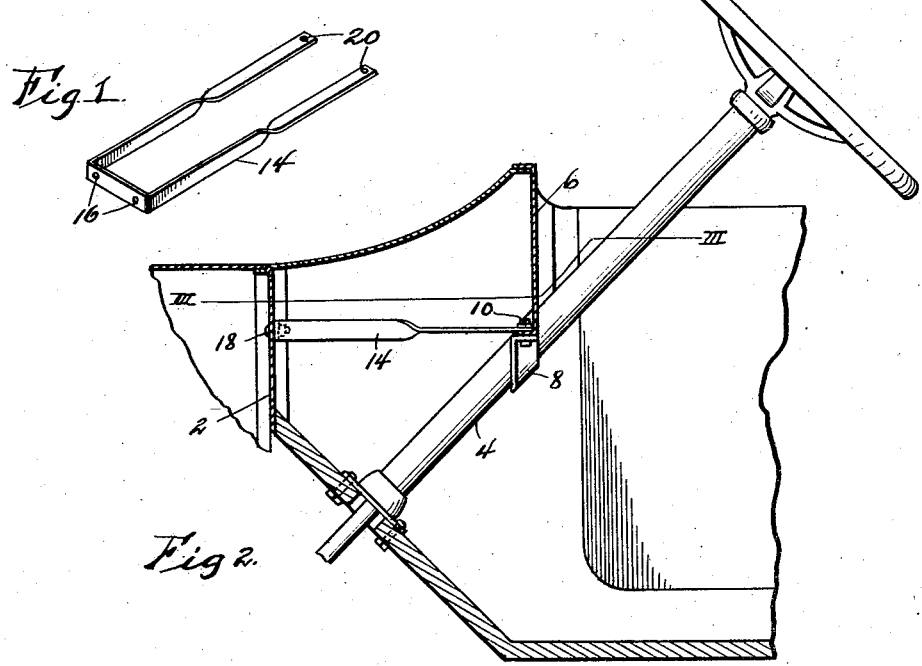
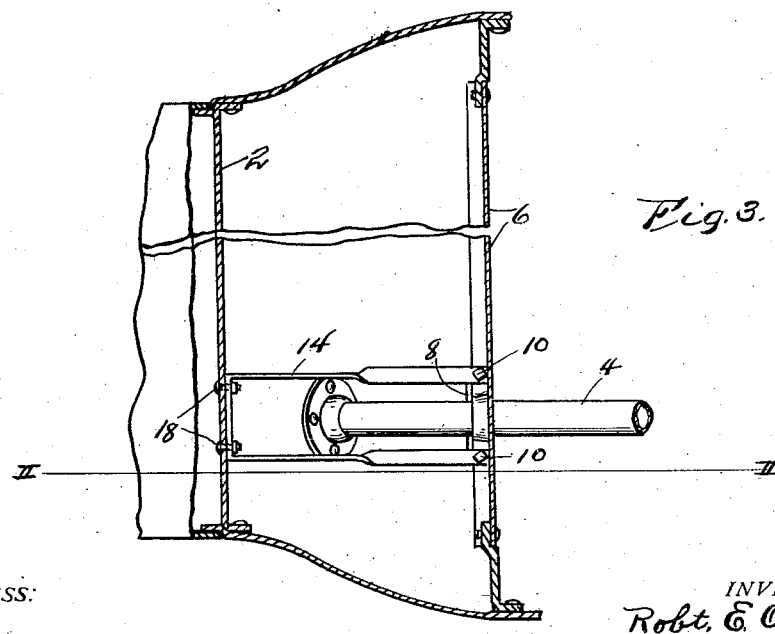
WITNESS:
R. Hamilton
INVENTOR.
Robt. E. O'Neil,
BY Chas. W. Gerard
ATTORNEY

UNITED STATES PATENT OFFICE.

ROBERT E. O'NEIL, OF KANSAS CITY, MISSOURI.

AUTOMOBILE BRACING ATTACHMENT.

1,269,955.   Specification of Letters Patent.   Patented June 18, 1918.

Application filed July 3, 1917. Serial No. 178,490.

*To all whom it may concern:*

Be it known that I, ROBERT E. O'NEIL, a citizen of the United States, residing at Kansas City, in the county of Jackson, State of Missouri, have invented certain new and useful Improvements in Automobile Bracing Attachments, of which the following is a full and exact specification.

The present invention relates to bracing means for automobile structures, and one of the objects in view is to provide a novel form of attachment adapted to brace and support the instrument-board of certain types of automobile bodies.

It is also an object to devise a suitable attachment of this character which will also serve to firmly support the steering column of the automobile as well as brace the instrument-board on which said steering column relies in part for its supporting means.

To this end the device comprises a bracing structure secured to the dash-board of the automobile body and also to the instrument-board in line with the steering column in such a manner as to securely brace the instrument-board and effectively aid in steadying and supporting the steering column.

It is further sought to devise a simple and strong attachment which may be cheaply manufactured, and quickly and conveniently applied to the automobile structures for which it is adapted.

With these general objects in view, the invention will now be described with reference to the accompanying drawing illustrating a form of construction which has been devised for embodying the improvements, after which the novel features will be set forth and defined in the appended claims.

In the drawing—

Figure 1 is a perspective view of the bracing attachment, detached from its bracing position;

Fig. 2 is a vertical sectional view (taken on the line II—II of Fig. 3) showing the attachment in the relation in which it is designed to be installed; and Fig. 3 is a horizontal section, taken on the line III—III of Fig. 2.

Referring to the drawing in detail, this illustrates a portion of an automobile structure having the dash-board 2 and the steering column 4 extending upwardly and rearwardly and intersecting the lower margin of what is usually termed the instrument-board 6 which supports various instruments (not shown). In this particular automobile construction the instrument-board 6 is utilized as a partial support for the steering column 4, which is provided with a yoke member 8 embracing said column and having the ends of the yoke secured by bolts 10 to the forwardly bent flange portion of the instrument-board, as shown in Figs. 2 and 3. As thus constructed it is found that the steering column is not afforded a sufficiently steady and fixed support, and too great a strain is exerted upon the instrument-board; and that both these parts are in fact in need of additional supporting and bracing means.

For this purpose I have devised a simple form of attachment comprising a rigid U-shaped brace member 14, preferably of flat steel bar material, having its transverse portion provided with bolt openings 16 for securing this transverse portion to the dash-board 2 by means of bolts 18. The opposite leg portions of this brace member 14 are of a length sufficient to span the distance between the dash 2 and the instrument-board 6, said leg portions being twisted so that the ends thereof will rest flat upon the flange 12 of the instrument-board, —this twisting of the legs also affording greater rigidity to the brace. The distance between the legs of the brace is equal to the length of the yoke 8, and the brace member is so located that said legs fall upon opposite sides of the steering column with the ends of the legs coming opposite the ends of said yoke 8, the terminals of the legs being provided with bolt openings 20 for the bolts 10, which thus serve to secure both the yoke and the brace members to the flange 12 of the instrument-board.

From the foregoing it will be apparent that a very simple and efficient means has been devised for carrying out the desired objects of the invention. The attachment is inexpensive and can be installed quickly and with very little trouble into the position shown, where it acts to firmly brace the instrument-board and coöperate therewith to afford a much more stable and substantial support for holding the steering column in proper fixed and rigid position.

While I have illustrated and described the preferred form of construction for the attachment, the right is reserved to such formal changes as may fall within the scope of the following claims.

Having described the invention, what I desire to protect by Letters-Patent is:

1. The combination with the instrument-board, dash-board and steering column of an automobile having the said steering column intersecting the lower margin of said instrument-board, of brace means secured to the dash-board and connected with said instrument-board and steering column upon opposite sides of said steering column.

2. The combination with the instrument-board, dash-board and steering column of an automobile having the said steering column intersecting the lower marginal portion of said instrument-board, of a brace comprising a rigid U-shaped member secured at one end to the dash-board and having the ends of its leg portions secured to the lower marginal portion of said instrument-board at the opposite sides of said steering column.

3. The combination with the instrument-board, dash-board and steering column of an automobile having the said steering column intersecting the lower marginal portion of said instrument-board, of a yoke member carried by said instrument-board and embracing said steering column, and a brace member secured at one end to said dash-board and at its opposite end to said instrument board and yoke member.

4. The combination with the instrument-board, dash-board and steering column of an automobile having the steering column intersecting the lower marginal portion of said instrument-board, of a yoke member embracing said steering column, and a brace member comprising a rigid U-shaped member secured at one end to said dash-board and having the ends of its leg portions extending to the lower margin of said instrument-board and provided with bolts securing the ends of said yoke and said leg portions to said lower margin of the instrument-board.

In witness whereof I hereto affix my signature.

ROBERT E. O'NEIL.

Copies of this patent may be obtained for five cents each, by addressing the "Commissioner of Patents, Washington, D. C."